United States Patent
Koyama et al.

(10) Patent No.: US 10,893,251 B2
(45) Date of Patent: Jan. 12, 2021

(54) THREE-DIMENSIONAL MODEL GENERATING DEVICE AND THREE-DIMENSIONAL MODEL GENERATING METHOD

(71) Applicant: Panasonic Intellectual Property Management Co., Ltd., Osaka (JP)

(72) Inventors: Tatsuya Koyama, Kyoto (JP); Toshiyasu Sugio, Osaka (JP); Toru Matsunobu, Osaka (JP); Satoshi Yoshikawa, Hyogo (JP); Pongsak Lasang, Singapore (SG); Chi Wang, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 16/295,582

(22) Filed: Mar. 7, 2019

(65) Prior Publication Data

US 2019/0208177 A1    Jul. 4, 2019

Related U.S. Application Data

(63) Continuation of application No. PCT/JP2017/031098, filed on Aug. 30, 2017.

(30) Foreign Application Priority Data

Sep. 12, 2016  (JP) .................................. 2016-177941

(51) Int. Cl.
*H04N 13/139*  (2018.01)
*H04N 13/282*  (2018.01)
(Continued)

(52) U.S. Cl.
CPC ............. *H04N 13/139* (2018.05); *G06T 7/55* (2017.01); *G06T 7/70* (2017.01); *G06T 7/85* (2017.01);
(Continued)

(58) Field of Classification Search
CPC ......... G06T 7/80; G06T 19/006; G06T 17/00; G06T 7/70; G06T 2207/30244;
(Continued)

(56) References Cited

U.S. PATENT DOCUMENTS 6,671,400 B1 * 12/2003 Ekpar ................... G06T 3/4038
 382/157
8,605,970 B2 * 12/2013 Bar-Aviv ................ G06T 5/002
 382/128
(Continued)

FOREIGN PATENT DOCUMENTS

JP    2-50273    2/1990
JP    2006-332900    12/2006
(Continued)

OTHER PUBLICATIONS

International Search Report (ISR) dated Nov. 28, 2017 in International (PCT) Application No. PCT/JP2017/031098.
(Continued)

*Primary Examiner* — Dave Czekaj
*Assistant Examiner* — Kehinde Abimbola
(74) *Attorney, Agent, or Firm* — Wenderoth, Lind & Ponack, L.L.P.

(57) ABSTRACT

A three-dimensional model generating device includes: a converted image generating unit that, for each of input images included in one or more items of video data and having mutually different viewpoints, generates a converted image from the input image that includes fewer pixels than the input image; a camera parameter estimating unit that
(Continued)

detects features in the converted images and estimates, for each of the input images, a camera parameter at a capture time of the input image, based on a pair of similar features between two of the converted images; and a three-dimensional model generating unit that generates a three-dimensional model using the input images and the camera parameters.

9 Claims, 14 Drawing Sheets

(51) Int. Cl.
  G06T 7/80 (2017.01)
  G06T 7/70 (2017.01)
  G06T 7/55 (2017.01)
(52) U.S. Cl.
  CPC . H04N 13/282 (2018.05); G06T 2207/10021 (2013.01)
(58) Field of Classification Search
  CPC .. G06T 5/006; G06T 7/85; G06T 7/55; G06T 15/20; G06T 2207/10016; G06T 7/593; G06T 7/60; G06T 7/73; G06T 19/003; G06T 19/20
  See application file for complete search history.

(56) References Cited

U.S. PATENT DOCUMENTS

| | | | |
|---|---|---|---|
| 8,842,181 B2* | 9/2014 | Kosaki | H04N 7/18 348/148 |
| 9,378,541 B2* | 6/2016 | Kim | G06T 5/002 |
| 2005/0175251 A1* | 8/2005 | Taketa | H04N 19/647 382/248 |
| 2006/0188131 A1 | 8/2006 | Zhang et al. | |
| 2011/0216194 A1* | 9/2011 | Kosaki | H04N 7/18 348/148 |
| 2011/0268328 A1* | 11/2011 | Bar-Aviv | G06T 5/002 382/128 |
| 2013/0202177 A1* | 8/2013 | Bar-Aviv | G06T 11/008 382/131 |
| 2013/0250070 A1* | 9/2013 | Takayama | B60R 1/00 348/47 |
| 2015/0010245 A1* | 1/2015 | Kim | G06T 5/002 382/254 |
| 2015/0077525 A1 | 3/2015 | Fujiwara | |
| 2017/0345184 A1 | 11/2017 | Tsubota et al. | |

FOREIGN PATENT DOCUMENTS

| | | |
|---|---|---|
| JP | 2011-254128 | 12/2011 |
| JP | 2014-32623 | 2/2014 |
| JP | 2015-56142 | 3/2015 |
| WO | 2016/103621 | 6/2016 |

OTHER PUBLICATIONS

Sameer Agarwal, et al., "Building Rome in a Day", 2009 IEEE 12th International Conference on Computer Vision (ICCV), Sep. 2009, pp. 72-79.

Yuma Hoshikawa, et al., "Measurement of pedestrian flow using subtraction stereo", The 17th Symposium on Sensing via Image Information (SSII), Jun. 2011, with partial English translation.

Extended European Search Report dated Aug. 30, 2019 in corresponding European Patent Application No. 17848627.0.

Vergauwen et al., "Web-based 3D Reconstruction Service", Machine Vision and Applications, vol. 17, No. 6, pp. 411-426, XP019440578, May 2006.

Professional: "Agisoft PhotoScan User Manual", XP055595369, 2013.

"Matlab—How does resizing an image affect the intrinsic camera matrix?—Signal Processing Stack Exchange", XP055595435, Nov. 2012.

Barbero-Garcia et al., "Low-Cost Smartphone-Based Photogrammetry for the Analysis of Cranial Deformation in Infants", World Neurosurgery, vol. 102, XP085051685, Jun. 2017.

Office Action dated Mar. 23, 2020 in corresponding European Patent Application No. 17848627.0.

* cited by examiner

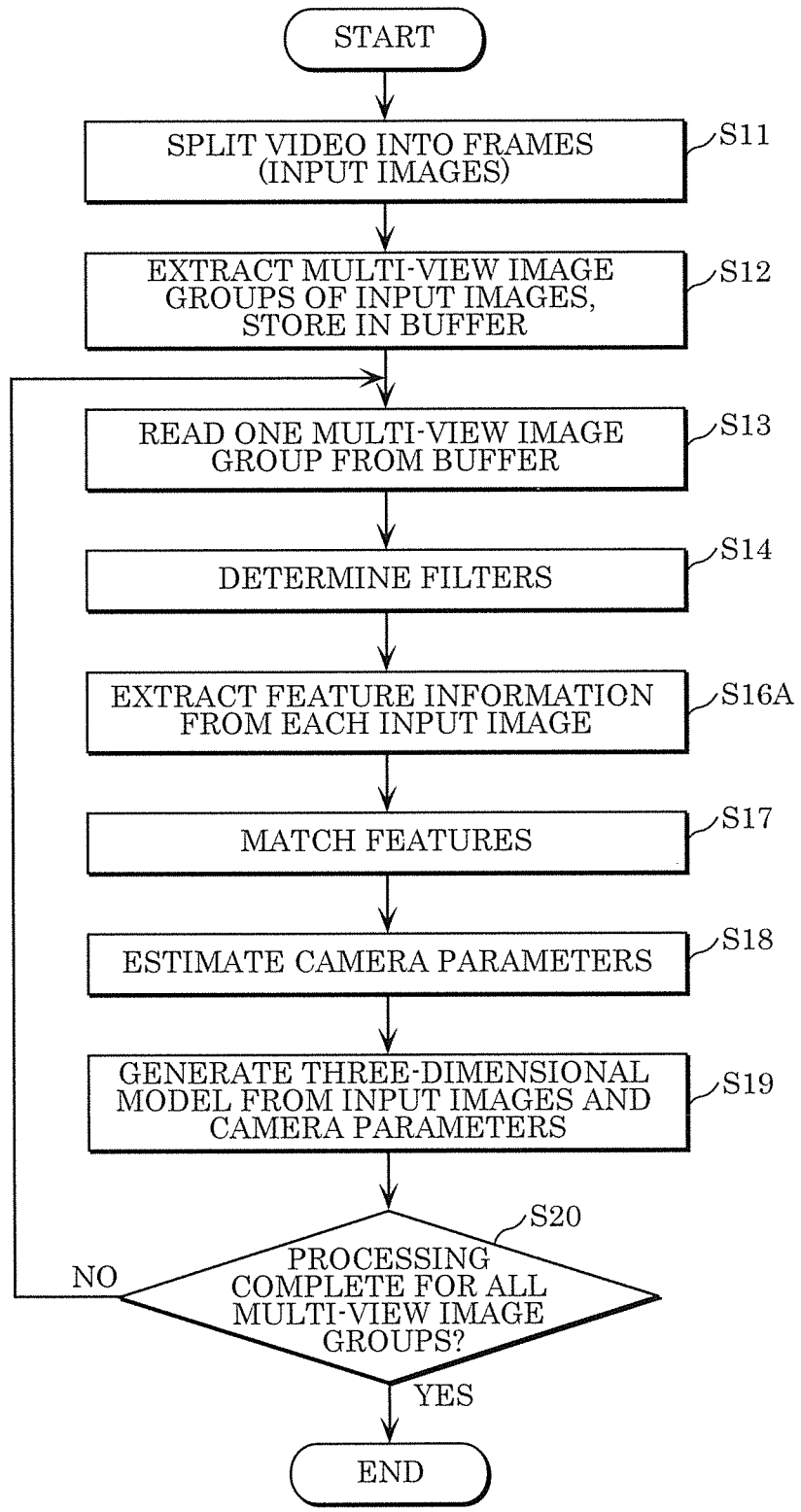

THREE-DIMENSIONAL MODEL GENERATING DEVICE AND THREE-DIMENSIONAL MODEL GENERATING METHOD

CROSS REFERENCE TO RELATED APPLICATIONS

This application is a U.S. continuation application of PCT International Patent Application Number PCT/JP2017/031098 filed on Aug. 30, 2017, claiming the benefit of priority of Japanese Patent Application Number 2016-177941 filed on Sep. 12, 2016, the entire contents of which are hereby incorporated by reference.

BACKGROUND

1. Technical Field

The present disclosure relates to a three-dimensional model generating device and a three-dimensional model generating method that generate a three-dimensional model using video captured by one or more cameras.

2. Description of the Related Art

In recent years, techniques for calculating the three-dimensional geometry of a subject, such as a person or an object, using a multi-view image obtained by capturing the subject from multiple views, and generating a three-dimensional model of the subject have been researched (for example, see S. Agarwal, N. Snavely, I. Simon, S. M. Seitz and R. Szeliski, "Building Rome in a Day", proc. International Conference on Computer Vision, 2009, Kyoto, Japan). These techniques include first geometrically estimating parameters of the camera (e.g., camera position, orientation, focal length in units of pixels, and lens distortion) at the time of capturing each of the images used to construct the multi-view image, and then projecting the pixels of the images onto a three-dimensional space using the estimated camera parameters to generate a three-dimensional model of the subject. Generating a three-dimensional model of the subject makes it possible to implement various services including 3D printed figure creation, structure recognition for terrain or buildings, human behavior recognition, and generation of free viewpoint video that allows viewing of a subject from a desired angle. A high resolution three-dimensional model is required to realize these services. Accordingly, a 4K, 8K, or higher resolution image is required.

However, the processing time required to estimate camera parameters increases as image resolution increases, and storage capacity increases exponentially. Accordingly, a computer having proportional processing power and storage capacity for generating such high-resolution three-dimensional models is required.

Additionally, a method of calculating distance information for a subject in an image using little storage space by storing and using a downsampled, low-resolution image has been proposed (for example, see Japanese Unexamined Patent Application Publication No. 2015-056142).

SUMMARY

The present disclosure has an object to provide a three-dimensional model generating device or a three-dimensional model generating method capable of reducing the amount of processing required for camera parameter estimation.

A three-dimensional model generating device according to one aspect of the present disclosure includes: a converted image generating unit configured to, for each of input images included in one or more items of video data and having mutually different viewpoints, generate a converted image from the input image that includes fewer pixels than the input image; a camera parameter estimating unit configured to detect features in the converted images and estimate, for each of the input images, a camera parameter at a capture time of the input image, based on a pair of similar features between two of the converted images; and a three-dimensional model generating unit configured to generate a three-dimensional model using the input images and the camera parameters.

A three-dimensional model generating device according to one aspect of the present disclosure includes: a filter generating unit configured to determine pixels to be searched in feature detection in each of input images included in one or more items of video data and having mutually different viewpoints; a camera parameter estimating unit configured to detect features in the input images from the pixels to be searched and estimate, for each of the input images, a camera parameter at a capture time of the input image, based on a pair of similar features between two of the input images; and a three-dimensional model generating unit configured to generate a three-dimensional model using the input images and the camera parameters.

The present disclosure can provide a three-dimensional model generating device or a three-dimensional model generating method capable of reducing the amount of processing required for camera parameter estimation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 14 illustrates a flow chart of processes performed by the three-dimensional model generation system according to Embodiment 4.

Figure 1:
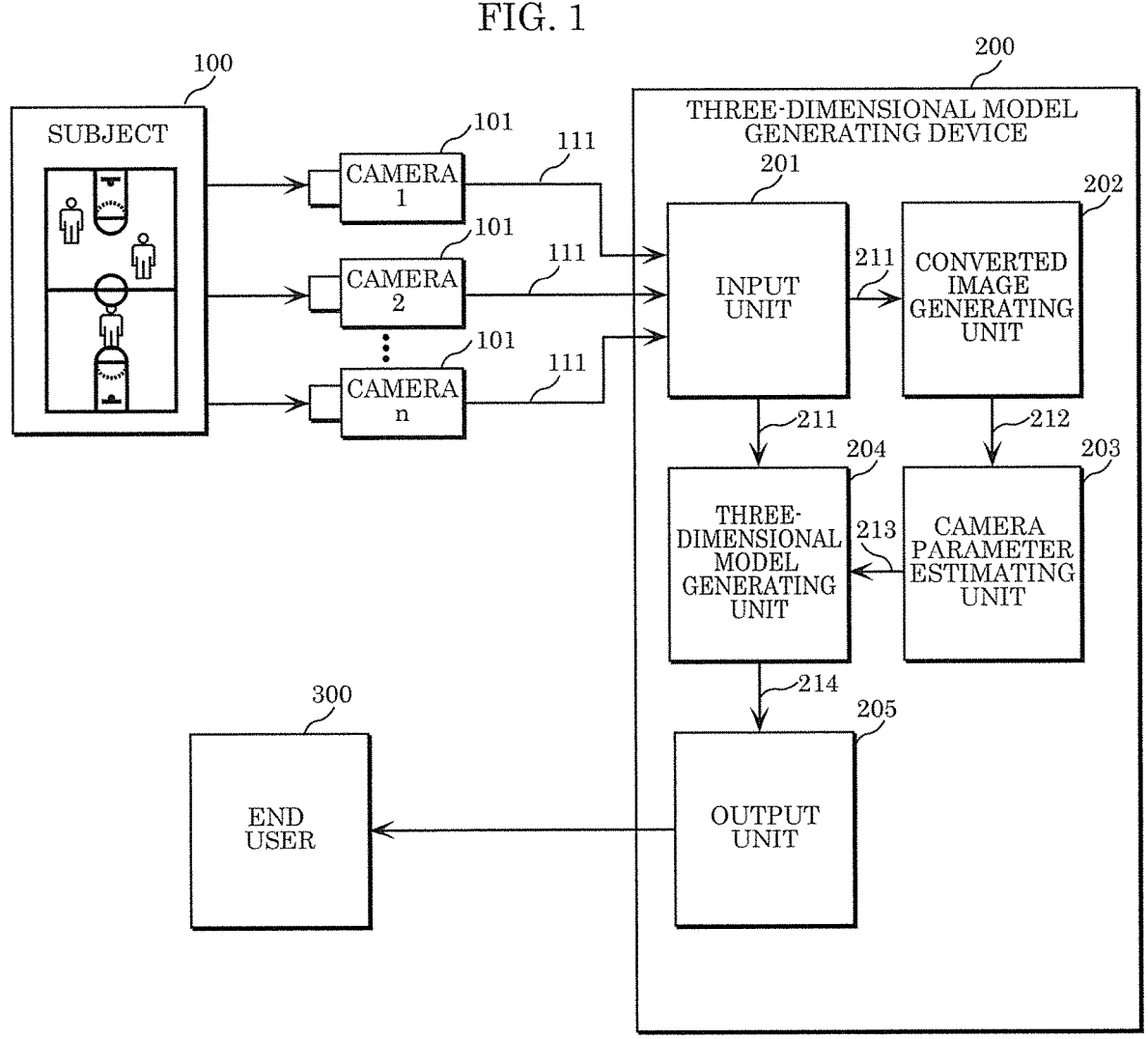
FIG. 1 illustrates the configuration of a three-dimensional model generation system according to Embodiment 1.

DETAILED DESCRIPTION OF THE EMBODIMENTS (Underlying Knowledge Forming Basis of an Aspect of the Present Invention)

One conventional method calculates distance information for a subject in a single image captured from a given viewpoint. Once this distance information is obtained, a partial three-dimensional model of the subject as seen from the captured viewpoint can be generated. For example, once distance information for a subject captured from the front in an image is obtained, a frontal portion three-dimensional model of the subject can be generated. However, partial three-dimensional models are not suitable for the services mentioned in the background art section above. Another conventional method captures a plurality of images in a time series from a single camera to construct a multi-view image. With this method, subjects for which distance information can be calculated are limited to stationary objects.

In view of the above, the present disclosure provides a device capable of generating a high resolution three-dimensional model with few processes and little storage space.

With the three-dimensional model generating device according to one aspect of the present disclosure, it is possible to generate a high resolution three-dimensional model with few processes and little storage space, by limiting the pixels to be used to estimate camera parameters and estimating the camera parameters. Since the three-dimensional model generating device according to one aspect of the present disclosure can generate a multi-view image using a plurality of videos captured by a plurality of cameras, the three-dimensional model generating device can generate a three-dimensional model of the subject even if the subject is a stationary object, a moving object, or includes both.

A three-dimensional model generating device according to one aspect of the present disclosure includes: a converted image generating unit configured to, for each of input images included in one or more items of video data and having mutually different viewpoints, generate a converted image from the input image that includes fewer pixels than the input image; a camera parameter estimating unit configured to detect features in the converted images and estimate, for each of the input images, a camera parameter at a capture time of the input image, based on a pair of similar features between two of the converted images; and a three-dimensional model generating unit configured to generate a three-dimensional model using the input images and the camera parameters.

This makes it possible to reduce the amount of processes required to estimate camera parameters since these processes are performed using converted images including fewer pixels than the respective input images.

For example, the converted image generating unit may be configured to generate each of the converted images by extracting pixels at predetermined pixel locations in the input image corresponding to the converted image.

For example, the converted image generating unit may be further configured to prioritize each of the predetermined pixel locations, and the camera parameter estimating unit may be configured to estimate the camera parameters preferentially using pixels at higher priority pixel locations among the predetermined pixel locations.

This makes it possible to efficiently estimate camera parameters.

For example, the converted image generating unit may be configured to extract the pixels at different pixel locations depending on content of the video data or a recording detail of the video data.

This makes it possible to efficiently estimate camera parameters since pixels appropriate for the video content or recording details can be used.

For example, the predetermined pixel locations may be in a central region of the input image.

This makes it possible to improve processing accuracy since a region with little distortion can be used.

For example, the predetermined pixel locations may include regions including four corners of the input image.

This makes it possible to use a highly distorted region to extract the distortion from the image.

For example, the converted image generating unit may be configured to generate the converted images by downsampling the input images.

This makes it possible to estimate camera parameters using information on all regions of the image.

For example, the camera parameter estimating unit may be configured to correct each of the camera parameters estimated using the converted images, based on a downsampling factor used in the downsampling, and the three-dimensional model generating unit may be configured to generate the three-dimensional model using the camera parameters corrected by the camera parameter estimating unit and the input images.

This makes it possible to appropriately estimate camera parameters for the original input images when downsampled converted images are used.

A three-dimensional model generating method according to one aspect of the present disclosure includes: generating, for each of input images included in one or more items of video data and having mutually different viewpoints, a converted image from the input image that includes fewer pixels than the input image; detecting features in the converted images and estimating, for each of the input images, a camera parameter at a capture time of the input image, based on a pair of similar features between two of the converted images; and generating a three-dimensional model using the input images and the camera parameters.

This makes it possible to reduce the amount of processes required to estimate camera parameters since these processes are performed using converted images including fewer pixels than the respective input images.

A three-dimensional model generating device according to one aspect of the present disclosure includes: a filter generating unit configured to determine pixels to be searched in feature detection in each of input images included in one or more items of video data and having mutually different viewpoints; a camera parameter estimating unit configured to detect features in the input images from the pixels to be searched and estimate, for each of the input images, a camera parameter at a capture time of the input image, based on a pair of similar features between two of the input images; and a three-dimensional model generating unit configured to generate a three-dimensional model using the input images and the camera parameters.

This makes it possible to reduce the amount of processes required to estimate camera parameters since these processes are performed using a portion of the pixels included in the input images.

For example, for each of the input images, a total number of the pixels to be searched may be less than a total number of pixels in the input image.

For example, the filter generating unit may be configured to determine pixels at predetermined pixel locations to be the pixels to be searched.

For example, the filter generating unit may be further configured to prioritize each of the pixel locations, and the camera parameter estimating unit may be configured to estimate the camera parameters preferentially using pixels at higher priority pixel locations among the predetermined pixel locations.

This makes it possible to efficiently estimate camera parameters.

For example, the predetermined pixel locations may be in a central region of the input image.

This makes it possible to improve processing accuracy since a region with little distortion can be used.

For example, the predetermined pixel locations may include regions including four corners of the input image.

This makes it possible to use a highly distorted region to extract the distortion from the image.

For example, the filter generating unit may be configured to determine the pixels to be searched based on content of the video data or a recording detail of the video data.

This makes it possible to efficiently estimate camera parameters since pixels appropriate for the video content or recording details can be used.

A three-dimensional model generating method according to one aspect of the present disclosure includes: determining pixels to be searched in feature detection in each of input images included in one or more items of video data and having mutually different viewpoints; detecting features in the input images from the pixels to be searched and estimating, for each of the input images, a camera parameter at a capture time of the input image, based on a pair of similar features between two of the input images; and generating a three-dimensional model using the input images and the camera parameters.

This makes it possible to reduce the amount of processes required to estimate camera parameters since these processes are performed using a portion of the pixels included in the input images.

A program according to one aspect of the present disclosure, for causing a computer to execute: generating, for each of input images included in one or more items of video data and having mutually different viewpoints, a converted image from the input image that includes fewer pixels than the input image; detecting features in the converted images and estimating, for each of the input images, a camera parameter at a capture time of the input image, based on a pair of similar features between two of the converted images; and generating a three-dimensional model using the input images and the camera parameters.

Hereinafter, embodiments are described in detail with reference to the drawings.

The embodiments described below each show a specific example of the present disclosure. The numerical values, shapes, materials, elements, the arrangement and connection of the elements, steps, order of the steps, etc., in the following embodiments are mere examples, and therefore do not intend to limit the present disclosure. Therefore, among elements in the following embodiments, those not recited in any of the independent claims defining the broadest concept are described as optional elements.

Embodiment 1

First, the configuration of a three-dimensional model generation system according to Embodiment 1 will be described. FIG. 1 illustrates the configuration of a three-dimensional model generation system according to this embodiment.

The three-dimensional model generation system according to Embodiment 1 includes a plurality of cameras 101 that capture subject 100, and three-dimensional model generating device 200 that receives an input of video data 111 including a plurality of videos captured by cameras 101. FIG. 1 also illustrates end user 300 to whom the three-dimensional model is provided via three-dimensional model generating device 200. Subject 100 includes a stationary object that does not move or a moving object such as a person, or both. Examples of subjects that include both a stationary object and a moving object include a sports game such as a basketball game, and an urban setting including people or cars.

Each camera 101 captures subject 100, and the captured video data 111 is output to three-dimensional model generating device 200. Overall, two or more cameras 101 capture subject 100. In other words, two or more cameras 101 capture the same scene (subject 100) from mutually different viewpoints. Each camera 101 is connected, via a wired or wireless connection, to input unit 201 of three-dimensional model generating device 200 itself, a communications device, or a hub such as a server (not illustrated in the drawings) so that video data 111 captured by cameras 101 is input into input unit 201. Moreover, video data 111 captured by cameras 101 may be output in real time, and, alternatively, may be temporarily stored in an external storage device such as memory or a cloud server and then output from the external storage device.

Moreover, cameras 101 may be fixed cameras such as surveillance cameras, may be mobile cameras such as video cameras, smartphones, or wearable cameras, and may be movable cameras such as drones having an image capturing function.

Three-dimensional model generating device 200 includes input unit 201, converted image generating unit 202, camera parameter estimating unit 203, three-dimensional model generating unit 204, and output unit 205. Three-dimensional model generating device 200 includes at least a computer system including processing circuitry such as a processor or logic circuit, and a storage device such as internal memory or accessible external memory. Three-dimensional model generating device 200 is implemented as hardware via processing circuitry, implemented by processing circuitry executing a software program either stored in memory or transmitted from an external server, or implemented as a combination of such hardware and software.

When input unit 201 receives a plurality of items of video data 111, input unit 201 performs preprocessing on video data 111. Preprocessing is, for example, brightness adjustment, video size adjustment, white balance adjustment, noise reduction, or frame rate conversion to equalize frame rates, or any combination thereof. Input unit 201 then splits the preprocessed video data 111 into input images 211, which are the frames of video data 111, extracts a plurality of simultaneously captured input images 211, and outputs a multi-view image group, which is a group of extracted simultaneously captured input images 211, to converted image generating unit 202 and three-dimensional model generating unit 204. Image information, time information, or sound information recorded at the same time as the capturing by cameras 101, or any combination thereof, is used to extract the plurality of simultaneously captured input images 211. Alternatively, a plurality of simultaneously captured frames may be extracted by connecting a plurality of cameras 101 together via a wired or wireless connection and causing the plurality of cameras 101 to start capturing simultaneously. Moreover, input unit 201 outputs multi-view image groups in chronological order according to capture time.

Converted image generating unit 202 generates, from a plurality of input images 211 included in one or more items of video data 111 and having mutually different viewpoints, a plurality of converted images 212, each including fewer pixels than the input image 211 it is generated from. More specifically, when converted image generating unit 202 performs feature detection on each input image 211 included in a multi-view image group, converted image generating unit 202 determines a filter for each input image 211 that restricts the area searched, generates converted images 212 from input images 211 using the determined filters, and outputs the generated converted images 212 to camera parameter estimating unit 203.

For example, the filters have the same vertical and horizontal size as each input image 211, and include binary images whose pixel values are either 0 (black) or 1 (white), and grayscale images whose pixel values fall between 0 (black) and 1 (white), inclusive. Features (feature points) include an outline of an object included in the image, corner or corners of an object or space included in the image, or a point, edge, or given region characterized by a significant change in luminance or color compared to a surrounding point, edge, or given region, such as a point, edge, or given region of intersection of two different objects included in the image.

FIG. 2A through FIG. 2H illustrate examples of binary image filters selectable by converted image generating unit 202. When using a binary image filter, pixels in input image 211 located where pixels having a pixel value of 1 in the filter image are located are extracted to generate converted image 212. In other words, converted image generating unit 202 generates converted image 212 by extracting pixels at predetermined pixel locations in input image 211.

FIG. 3A through FIG. 3H illustrate examples of grayscale image filters selectable by converted image generating unit 202. When using a grayscale image filter, pixels in input image 211 located where pixels of pixel values greater than 0 in the filter image are located are extracted and information indicating the filter pixel values is appended to the extracted pixels to generate converted image 212. In other words, converted image generating unit 202 further prioritizes each of the pixels in converted image 212, and camera parameter estimating unit 203 estimates camera parameters preferentially using pixels with higher priority.

Note that using the filters illustrated in FIG. 2A through FIG. 2H and FIG. 3A through FIG. 3H achieves the same effect as extracting a required region from the image (i.e., trimming).

The user may specify a filter to be used in advance, and, alternatively, a filter may be selected automatically based on image information or a recording detail. In other words, converted image generating unit 202 may extract pixels at different pixel locations depending on the content or a recording detail of the video.

For example, when an object for which a feature is easily detected, such as a person, text, or building, is centrally located in the frame, a filter that searches for pixels in the center of the frame is selected, such as one of the filters illustrated in FIG. 2A, FIG. 2B, FIG. 3A, and FIG. 3B. Note that a region including an object such as a person, text, or building may be automatically detected by a detector, and, alternatively, may be stipulated in advance. For example, an object, such as a person, text, or building in a frame can be detected using facial recognition or a pixel feature.

In other words, the location of an object whose feature is easily detected may be specified using image information, and a plurality of pixels including pixels at pixel locations that overlap with the object may be extracted. For example, such pixels are located in the central region of input image 211. Moreover, for example, information indicating that a person is being captured may be input as a recording detail, and the filter may be selected based on the input recording detail.

Moreover, when estimating lens distortion, converted image generating unit 202 selects a filter that searches a wide range of pixel locations in the frame, such as the filters illustrated in FIG. 2F, FIG. 2H, FIG. 3F, and FIG. 3H. When input image 211 is estimated to include fisheye lens distortion, converted image generating unit 202 may select a filter that searches regions including the four corners of the frame, such as the filters illustrated in FIG. 2F, FIG. 2G, FIG. 2H, FIG. 3F, FIG. 3G, and FIG. 3H. In other words, pixels in pixel locations including regions including the four corners of input image 211 may be extracted. In such cases, camera information (indicating presence or absence of distortion) may be input as a recording detail, and, alternatively, information indicating the presence or absence of distortion may be input by the user as a recording detail.

Note that the filters illustrated in FIG. 2A through FIG. 2H and FIG. 3A through FIG. 3H are merely examples. The shapes, surface area ratio, and positions of the white and black regions are not limited to these examples. Any filter that restricts the region of the frame that is searched in feature detection may be used. Moreover, one or more types of filters may be used for a single frame. In other words, a plurality of filters may be used to restrict the searched area.

Camera parameter estimating unit 203 detects features in a plurality of converted images 212 and estimates, for each of the plurality of input images 211, a camera parameter at a capture time of input image 211, based on a pair of similar features between two converted images 212. More specifically, camera parameter estimating unit 203 searches pixels in converted images 212 corresponding to all input images 211 included in a multi-view image group, detects features in those converted images 212, and stores feature information indicating the detected features. Feature information indicates, as vectors, a color or luminance gradient distribution for pixels in a specific range including a feature or approximately centered on a feature.

Figure 2A:
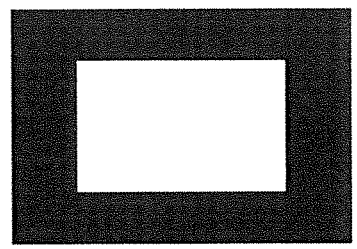
FIG. 2A illustrates an example of a binary image filter according to Embodiment 1.
Figure 2B:
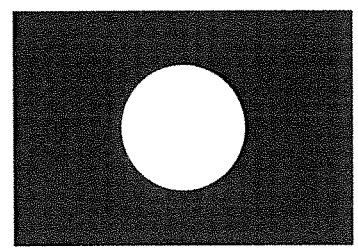
FIG. 2B illustrates an example of a binary image filter according to Embodiment 1.
Figure 2C:
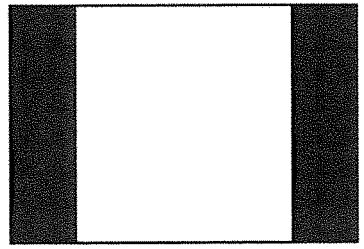
FIG. 2C illustrates an example of a binary image filter according to Embodiment 1.
Figure 2D:
FIG. 2D illustrates an example of a binary image filter according to Embodiment 1.
Figure 2E:
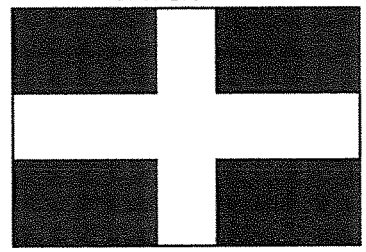
FIG. 2E illustrates an example of a binary image filter according to Embodiment 1.
Figure 2F:
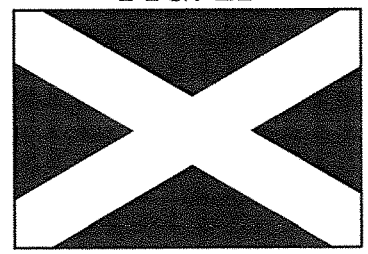
FIG. 2F illustrates an example of a binary image filter according to Embodiment 1.
Figure 2G:
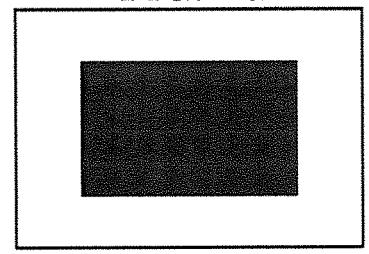
FIG. 2G illustrates an example of a binary image filter according to Embodiment 1.
Figure 2H:
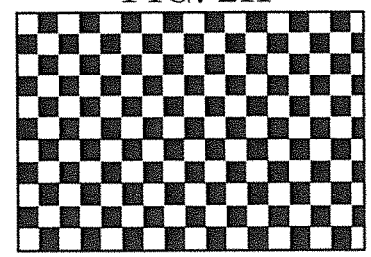
FIG. 2H illustrates an example of a binary image filter according to Embodiment 1.
Figure 3A:
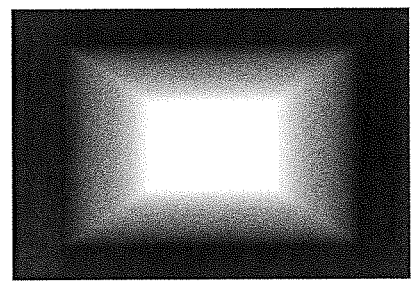
FIG. 3A illustrates an example of a grayscale image filter according to Embodiment 1.
Figure 3B:
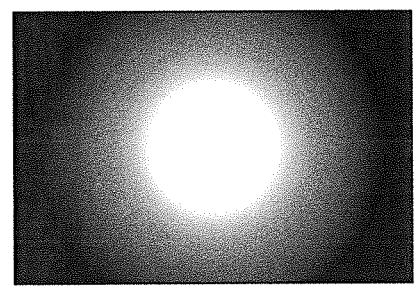
FIG. 3B illustrates an example of a grayscale image filter according to Embodiment 1.
Figure 3C:
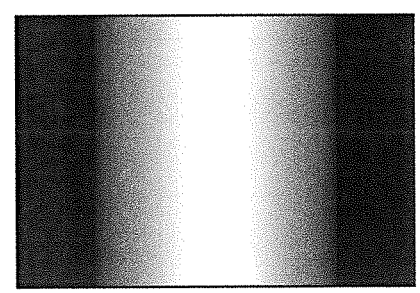
FIG. 3C illustrates an example of a grayscale image filter according to Embodiment 1.
Figure 3D:
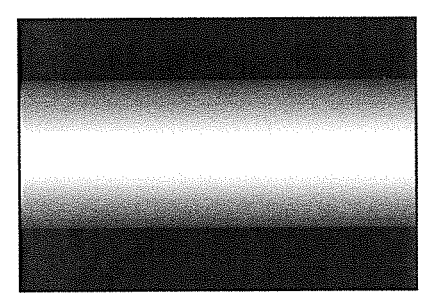
FIG. 3D illustrates an example of a grayscale image filter according to Embodiment 1.
Figure 3E:
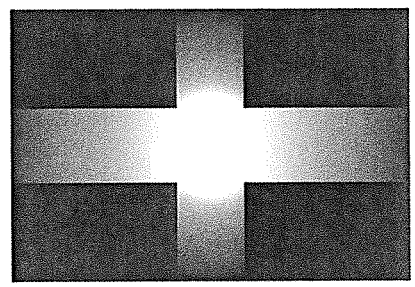
FIG. 3E illustrates an example of a grayscale image filter according to Embodiment 1.
Figure 3F:
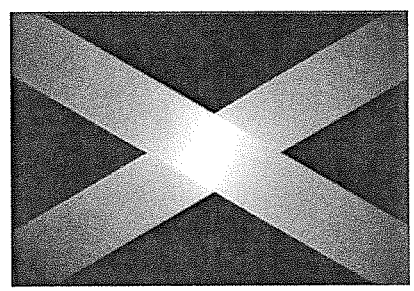
FIG. 3F illustrates an example of a grayscale image filter according to Embodiment 1.
Figure 3G:
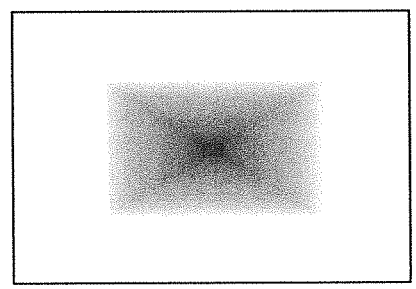
FIG. 3G illustrates an example of a grayscale image filter according to Embodiment 1.
Figure 3H:
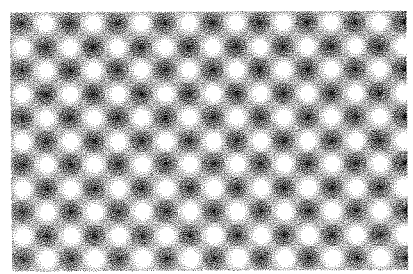
FIG. 3H illustrates an example of a grayscale image filter according to Embodiment 1.

For example, when a binary image such as one of the binary images illustrated in FIG. 2A through FIG. 211 is used as a filter to generate converted image 212, camera parameter estimating unit 203 performs feature searching and detection on all pixels in converted image 212. Moreover, when a grayscale image such as one of the grayscale images illustrated in FIG. 3A through FIG. 311 is used as a filter to generate converted image 212, feature searching and detection is performed on all pixels in converted image 212, and when the number of detected features exceeds a predetermined number, features at pixel locations of pixels with low priority are deleted to reduce the number of features to less than or equal to the predetermined number. Alternatively, the feature searching and detection is performed in order of priority, starting with pixel locations of pixels in converted image 212 with highest priority, and when the number of detected features reaches a predetermined number, or when all pixels having a pixel value other than 0 have been searched, the searching is ended.

In this way, searching for features using converted image 212 generated using a filter makes it possible to restrict the number of pixels searched, which in turn makes it possible to reduce the amount of processes and storage space required to detect features. Moreover, the number of features is reduced by restricting the region that is searched for features. This makes it possible to reduce the amount of processes and storage space required to calculate feature information. When calculating feature information, camera parameter estimating unit 203 may use all pixels in a specified range centered on or including a feature, and may use only those pixels in converted image 212 that are in a specified range centered on or including a feature and whose priority is above a given degree.

After feature information for all converted images 212 in a multi-view image group have been recorded, camera parameter estimating unit 203 derives a pair of features with similar feature information between two converted images 212. Camera parameter estimating unit 203 further calculates two-dimensional coordinates for each feature in the pair of features on the respective converted images 212, and records matching information including the calculated coordinates. Note that similar features are also referred to as matching features. For example, a squared error or absolute error of the feature information is used for determining whether or not the two items of feature information are similar.

Once matching information is obtained, based on a geometric constraint such as epipolar constraint or a nonlinear optimization method such as bundle adjustment, camera parameter estimating unit 203 estimates camera parameter 213 for each camera 101 that captured an input image 211 included in the multi-view image group, and outputs the plurality of estimated camera parameters 213 to three-dimensional model generating unit 204. Here, examples of camera parameters 213 include a central coordinate of a three-dimensional space of the camera, an orientation of the camera, a focal length in units of pixels of the camera, and a lens distortion coefficient of the camera. Note that camera parameter estimating unit 203 may estimate each of the above parameters, i.e., a central coordinate of a three-dimensional space of the camera, an orientation of the camera, a focal length in units of pixels of the camera, and a lens distortion coefficient of the camera, and, alternatively, may use one or more parameters calibrated ahead of time to estimate the remaining parameters. Moreover, camera parameter estimating unit 203 may use the matching information and the estimated camera parameters 213 to calculate coordinates in a three-dimensional space of each matching feature based on the triangulation principle, and output three-dimensional point cloud information, which is information including the matching information and the three-dimensional coordinates of the matching features, to three-dimensional model generating unit 204.

Three-dimensional model generating unit 204 generates three-dimensional model 214 of subject 100 using the multi-view image group (plurality of input images 211) obtained from input unit 201 and camera parameters 213 obtained from camera parameter estimating unit 203, and outputs three-dimensional model 214 to output unit 205. Here, three-dimensional model 214 is (1) a point cloud model of points included in, for example, three-dimensional position information, color information, and gradient information, (2) a mesh model including information on the connections between points in a point cloud in addition to information included in the point cloud model, or (3) a voxel model obtained by evenly dividing a three-dimensional space into smaller spaces (voxels), and including color information, gradient information, and information on the presence or absence of points in the voxels.

A typical three-dimensional model generation method, such as a multi stereo matching method or shape-from-silhouette method, can be used in the three-dimensional model generation. When a multi stereo matching method is used, three-dimensional model generating unit 204 detects matching features for each pixel in each frame and projects a matching feature onto an intersecting point of straight lines passing through the matching features and the central coordinate of the camera to generate a three-dimensional model of the subject. Note that when detecting matching features, three-dimensional model generating unit 204 may use matching information in the three-dimensional point cloud information obtained from camera parameter estimating unit 203 to reduce the amount of processes for matching feature detection.

Figure 4:
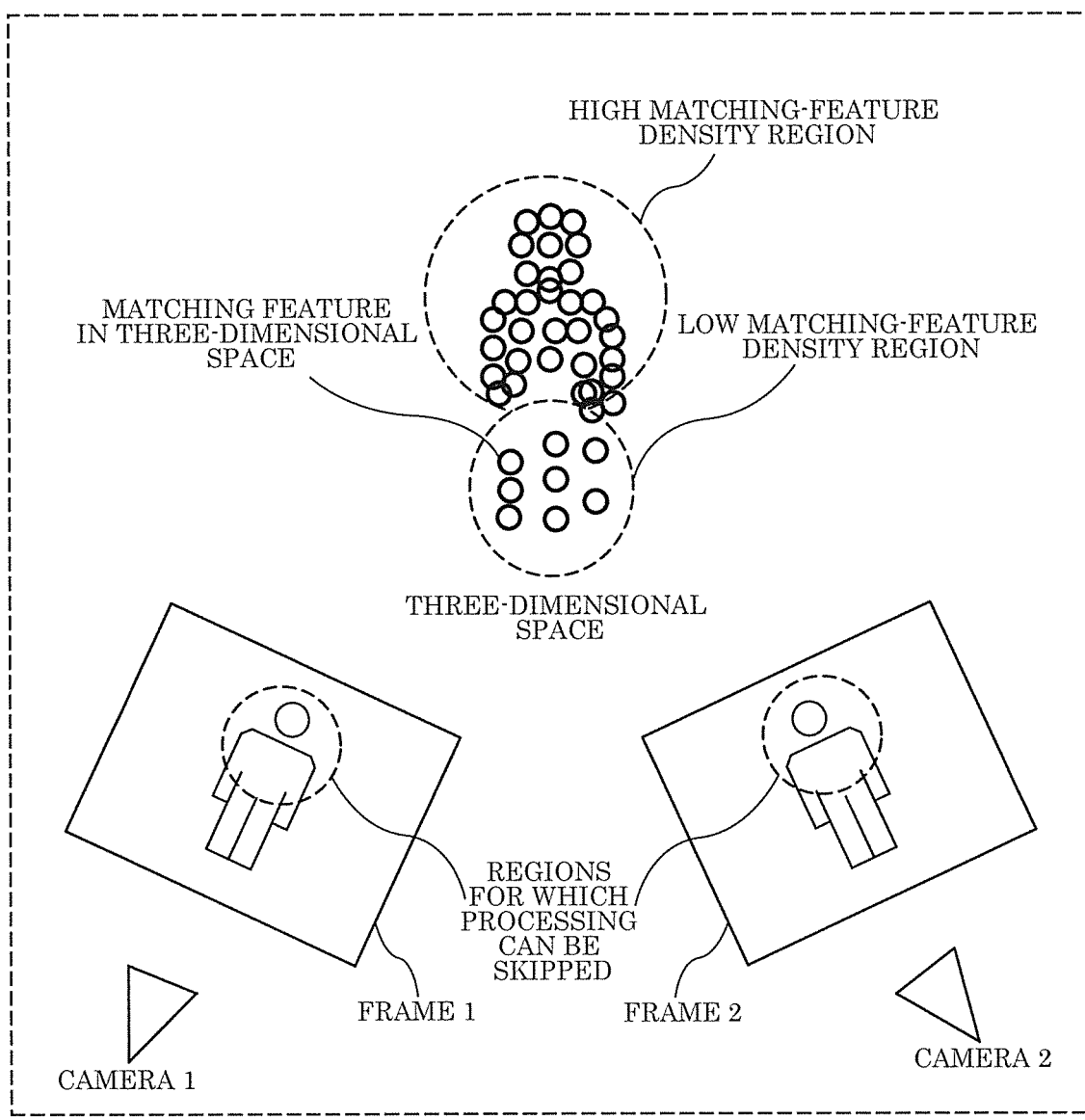
FIG. 4 illustrates three-dimensional point cloud information and regions that do not need to be processed according to Embodiment 1.

Moreover, three-dimensional model generating unit 204 may detect, from three-dimensional coordinates of matching features in three-dimensional point cloud information obtained from camera parameter estimating unit 203, a high matching-feature density region of three-dimensional points calculated at a sufficient density and a low matching-feature density region of three-dimensional points not calculated at a sufficient density, and skip processing for detecting matching features or projecting matching features for pixels corresponding to the high matching-feature density region, as illustrated in FIG. 4. With this, three-dimensional model generating unit 204 can reduce the amount of processing required to detect or project matching features.

When a shape-from-silhouette method is used, three-dimensional model generating unit 204 projects a silhouette of the subject in each input image 211 in a three-dimensional space, and the intersection(s) of the silhouettes forms a three-dimensional model. Moreover, three-dimensional model generating unit 204 projects, via back projection, a voxel of the three-dimensional space onto each input image 211, and leaves only those voxels whose projected points are inside the silhouette of the subject in each input image 211 to form a three-dimensional model. A silhouette of a subject required for the shape-form-silhouette method can be extracted by finding the difference between a background image captured in advance and the input image. Moreover, three-dimensional model generating unit 204 may extract a silhouette of a subject using object region information used when converted image generating unit 202 selects the filter, or three-dimensional point cloud information object recognition information obtained from camera parameter estimating unit 203.

In this way, three-dimensional model generating unit 204 can generate a high resolution three-dimensional model 214 by generating three-dimensional model 214 using all pixels in input images 211 having their original resolutions as captured by camera 101.

When output unit 205 receives three-dimensional model 214, output unit 205 transmits three-dimensional model 214 to end user 300 by a display or a recording medium included in three-dimensional model generating device 200 displaying or storing three-dimensional model 214, or a display or a recording medium connected via a wired or wireless connection displaying or storing three-dimensional model 214. Note that output unit 205 may transmit three-dimensional model 214 to the screen or the recording medium in a terminal used by end user 300 over a network. Alternatively, when transmitting three-dimensional model 214, output unit 205 may inhibit the amount of data transmitted and the amount of storage used by lossless or lossy compression of three-dimensional model 214. Moreover, when displaying three-dimensional model 214 on a display or the screen of a terminal used by end user 300, output unit 205 may render the three-dimensional model and convert the three-dimensional model into a two-dimensional image from a given perspective, and transmit and display the two-dimensional image. Moreover, output unit 205 may display three-dimensional model 214 as a hologram or on a three-dimensional display. Moreover, output unit 205 may detect a region in three-dimensional model 214 that lacks sufficient resolution from, for example, point density information on three-dimensional model 214, and present end user 300 with a perspective from which that region can be captured, as a insufficient perspective.

When viewing the two-dimensional image rendered on the display or terminal screen, end user 300 can use a mouse or touch inputs to zoom in, zoom out, or change the perspective of the two-dimensional image. This allows end user 300 to view three-dimensional model 214 from 360 degrees, i.e., from all perspectives. End user 300 may inspect the insufficient perspective presented by output unit 205 or visually inspect the three-dimensional model, and input video from the insufficient perspective into three-dimensional model generating device 200 to recreate the three-dimensional model.

Figure 5:
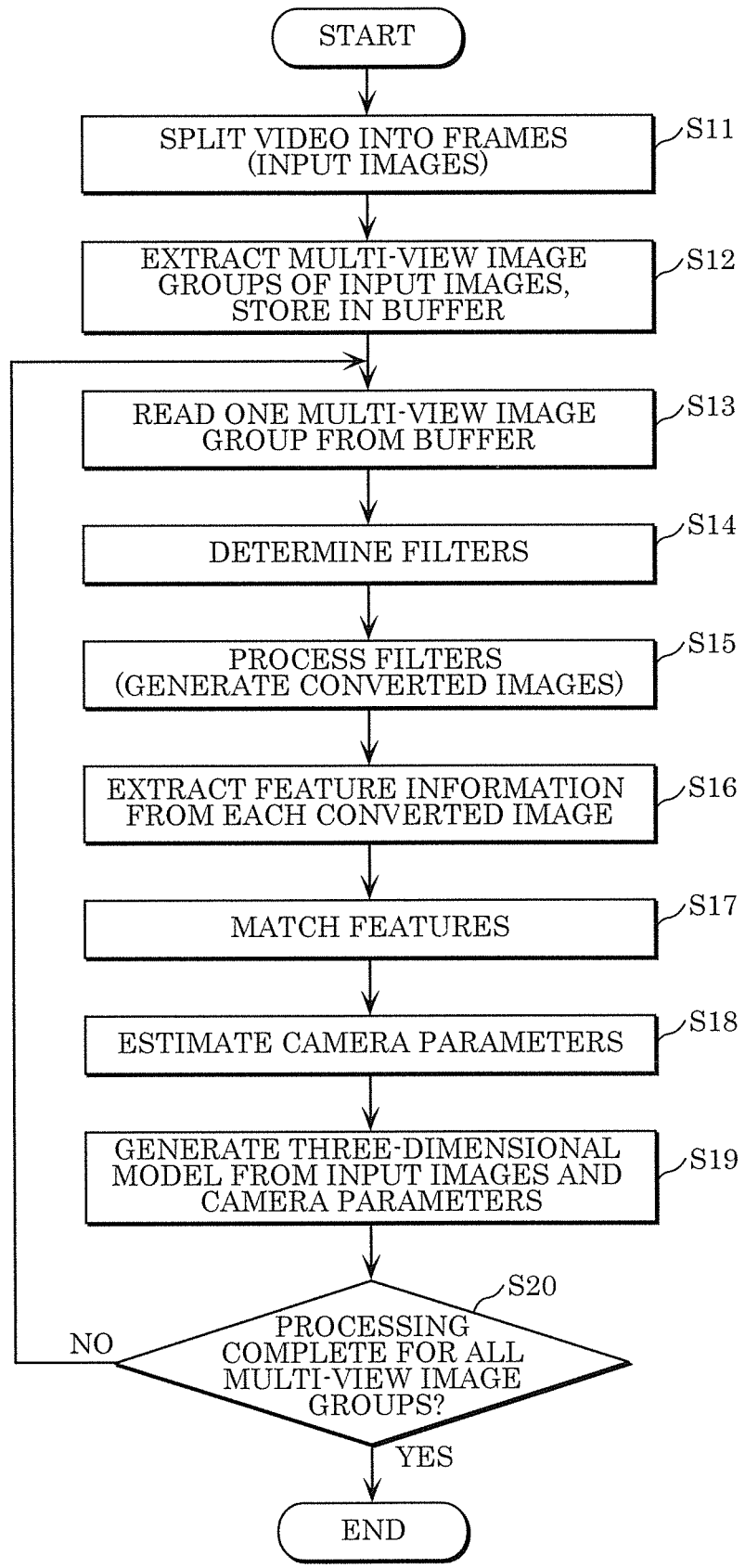
FIG. 5 illustrates a flow chart of processes performed by the three-dimensional model generation system according to Embodiment 1.

Next, an example of a flow of processes performed by the three-dimensional model generation system according to this embodiment will be described with reference to FIG. 5. In the following example, three videos V1, V2, and V3 of moving people captured by three cameras C1, C2, and C3, respectively, are input into input unit 201.

First, input unit 201 performs preprocessing on videos V1, V2, and V3 and splits videos V1, V2, and V3 into frames (input images 211) (step S11). Here, in one example, each video V1, V2, and V3 is split into five frames, frames V1_1 through V1_5, frames V2_1 through V2_5, and frames V3_1 through V3_5.

Figure 6:
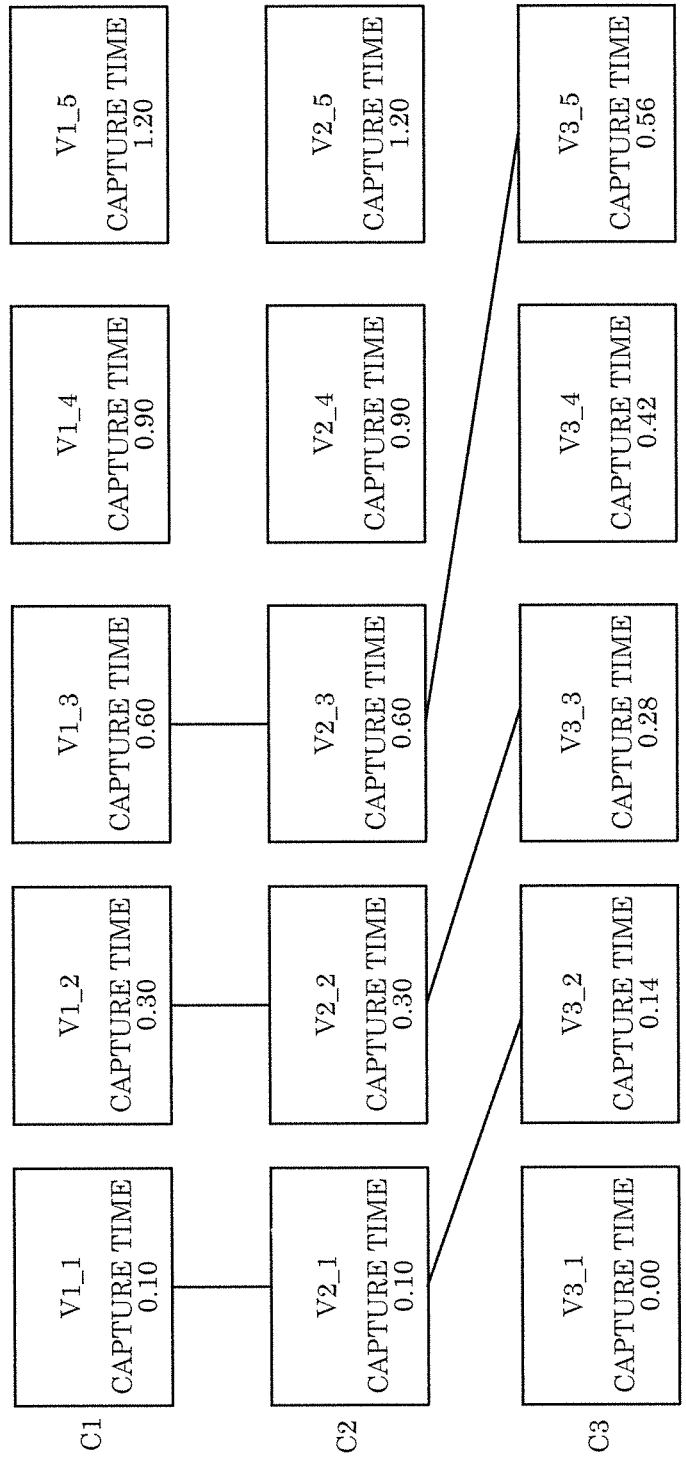
FIG. 6 illustrates an example of determining a multi-view image based on capture time according to Embodiment 1.

Then, input unit 201 extracts simultaneously captured frames from the videos, as illustrated in FIG. 6, determines multi-view image groups each including simultaneously captured and extracted frames, and stores the multi-view image groups in a buffer (step S12). Here, input unit 201 extracts frames having the same appended capture times. For example, input unit 201 extracts V1_1 and V2_1 as a multi-view image group. When there are no simultaneously captured frames among the videos, input unit 201 may include frames having the closest capture times in a multi-view image group, like V1_1, V2_1, and V3_2 in FIG. 6.

When one or more multi-view image groups are stored in the buffer, converted image generating unit 202 retrieves the multi-view image group having the earliest capture time from the buffer (step S13). Next, converted image generating unit 202 determines a filter for each frame included in the multi-view image group (V1_1, V2_1, and V3_2) (step S14). The filter is determined based on image information on the frame, a recording detail, or as specified by the user in advance. For example, when a person or people for which a large number of features are likely to be extracted are detected in the central region of frame V1_1 and lens distortion information is appended to frame V1_1, converted image generating unit 202 selects the filter illustrated in FIG. 2A to detect features in the central region of the frame. When a person or people are detected in the central region of frame V2_1, similar to frame V1_1, but no lens distortion information is appended to frame V2_1 and thus needs to be estimated, converted image generating unit 202 selects the filter illustrated in FIG. 2F to detect features over a wide area. Since lens distortion greatly affects pixels in the periphery of the frame, a filter that can detect features in the periphery of the frame for estimating lens distortion is effective. In frame V3_2, a person or people are detected across the entire frame, so converted image generating unit 202 selects the filter illustrated in FIG. 2H that can detect features over a wide area of the frame.

Next, converted image generating unit 202 generates converted image 212 for each frame using the determined filters (step S15).

Next, camera parameter estimating unit 203 detects features in converted images 212 of the frames included in the multi-view image group (i.e., V1_1, V2_1, and V3_2), and extracts feature information (step S16).

In this way, the searching and detection of features in each frame is performed only in the white regions of the filters determined for each frame in step S14. Thus, detection of features useful for determining camera parameters can be performed with little processing and little amount of storage space.

Thereafter, camera parameter estimating unit 203 detects matching features by comparing feature information for two frames, and generates matching information indicating the matching features (S17).

Once matching information is obtained, camera parameter estimating unit 203 estimates one or more camera parameters 213 for each frame included in the multi-view image group based on a geometric constraint such as epipolar constraint or a nonlinear optimization method such as bundle adjustment (step S18).

Lastly, three-dimensional model generating unit 204 generates three-dimensional model 214 of subject based on the frames included in the multi-view image group (i.e., input images 211) and camera parameters 213 corresponding to the frames, and stores or displays the generated three-dimensional model 214 on a recording medium or on a display (step S19).

If processing for all multi-view image groups is not yet complete (no in step S20), the next multi-view image group is read from the buffer (step S13), and processing for the multi-view image group starting from step S14 is performed. If processing for all multi-view image groups is complete (yes in step S20), three-dimensional model generating device 200 ends the processing.

Note that for cameras C1, C2, and C3 on the second and subsequent processing loops, processing in steps S14 through S18 may be omitted for input images 211 captured by camera 101 for which camera parameter values are determined to be the same as camera parameter values estimated in the previous processing loop. Whether or not camera parameter values have changed can be determined by, for example, detecting movement of camera 101 using at least one of a vibration sensor, GPS sensor, and velocity sensor included in camera 101. Alternatively, whether or not camera parameter values have changed can be determined by detecting a change in the movement or zoom of camera 101 using image information. In the case of a fixed camera, it may be determined that camera parameters do not change. With this, when camera 101 moves, or when the focal length of camera 101 changes, a three-dimensional model can be estimated efficiently since camera parameters are re-estimated.

The above processes generate a three-dimensional model 214 for each capture time. It is possible to display a video of a three-dimensional model of a moving object by displaying three-dimensional models 214 in chronological order. Moreover, end user 300 may inspect three-dimensional model 214 displayed after a determination of "yes" in step S19 or step S20, and when end user 300 determines that three-dimensional model 214 lacks sufficient resolution, three-dimensional model generating device 200 may obtain video data 111 from the insufficient perspective and reconstruct three-dimensional model 214.

In this way, the three-dimensional model generation system according to this embodiment can reduce the amount of pixel data accessed and stored by using filters when searching for and detecting features in the frames and extracting feature information, which in turn reduces the amount of processes and storage space required to estimate camera parameters. Moreover, since all pixels in the frames can be used to generate the three-dimensional model, the three-dimensional model generation system can generate a high-resolution three-dimensional model. Furthermore, since the three-dimensional model generation system generates a three-dimensional model using a single multi-view image group of frames captured at the same capture time, the three-dimensional model generation system can generate a three-dimensional model of subject 100 even if subject 100 is a stationary object, moving object, or includes both. In the above example, fixed interval video data 111 is input into three-dimensional model generating device 200, but video data 111 may be input into three-dimensional model generating device 200 frame-by-frame as captured by camera 101.

Embodiment 2

Figure 7:
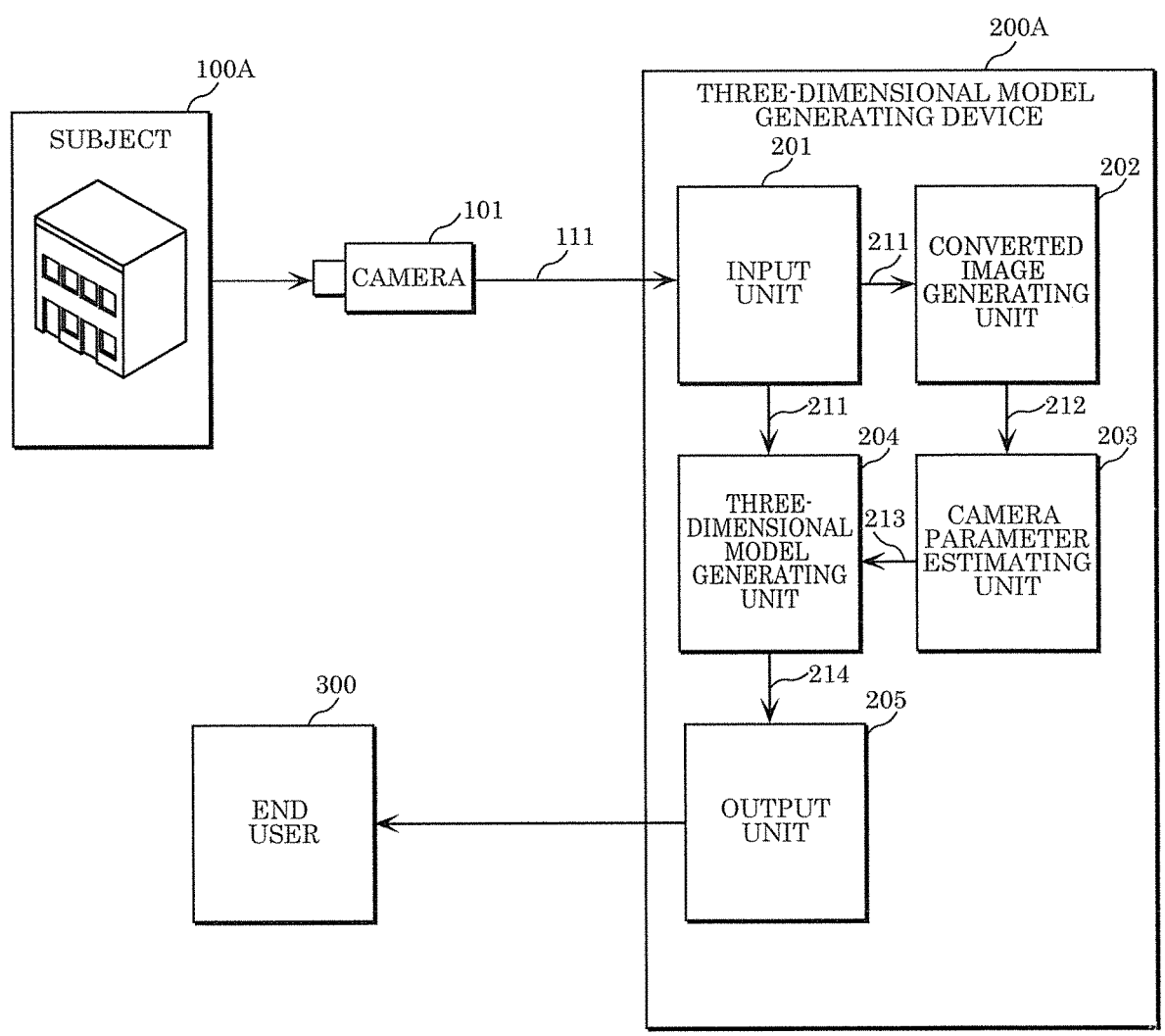
FIG. 7 illustrates the configuration of a three-dimensional model generation system according to Embodiment 2.

Next, the configuration of a three-dimensional model generation system according to Embodiment 2 will be described. FIG. 7 illustrates the configuration of a three-dimensional model generation system according to this embodiment. As illustrated in FIG. 7, in this embodiment, subject 100A is a stationary object. Moreover, subject 100A is captured by a single camera 101. Camera 101 captures subject 100A from a plurality of locations (viewpoints). Note that camera 101 may include a plurality of cameras, as is the case in Embodiment 1. Moreover, the processes performed by three-dimensional model generating device 200A according to this embodiment differ from the processes in Embodiment 1. Note that hereinafter, description will focus on the points of difference between Embodiment 1, and overlapping description will be omitted.

Three-dimensional model generating device 200A differs from three-dimensional model generating device 200 according to Embodiment 1 mainly in regard to operations performed by input unit 201. In particular, the method used to extract a multi-view image group is different.

When input unit 201 receives one or more items of video data 111, input unit 201 performs the same preprocessing described in Embodiment 1 on the one or more items of video data 111. Next, after the preprocessing, input unit 201 splits the one or more items of video data 111 into input images 211, which are the frames of the one or more items of video data 111, extracts a certain number of input images 211, and outputs a multi-view image group of the extracted input images 211 to converted image generating unit 202 and three-dimensional model generating unit 204.

Here, in the extraction of a certain number of input images 211, input unit 201 extracts input images 211 captured from different viewpoints based on image information, extracts input images 211 at regular intervals from each video, or extracts input images 211 captured from viewpoints located at least a certain distance away based on, for example, a GPS sensor or velocity sensor in camera 101. Note that input unit 201 may extract all input images 211 as a multi-view image group.

Figure 8:
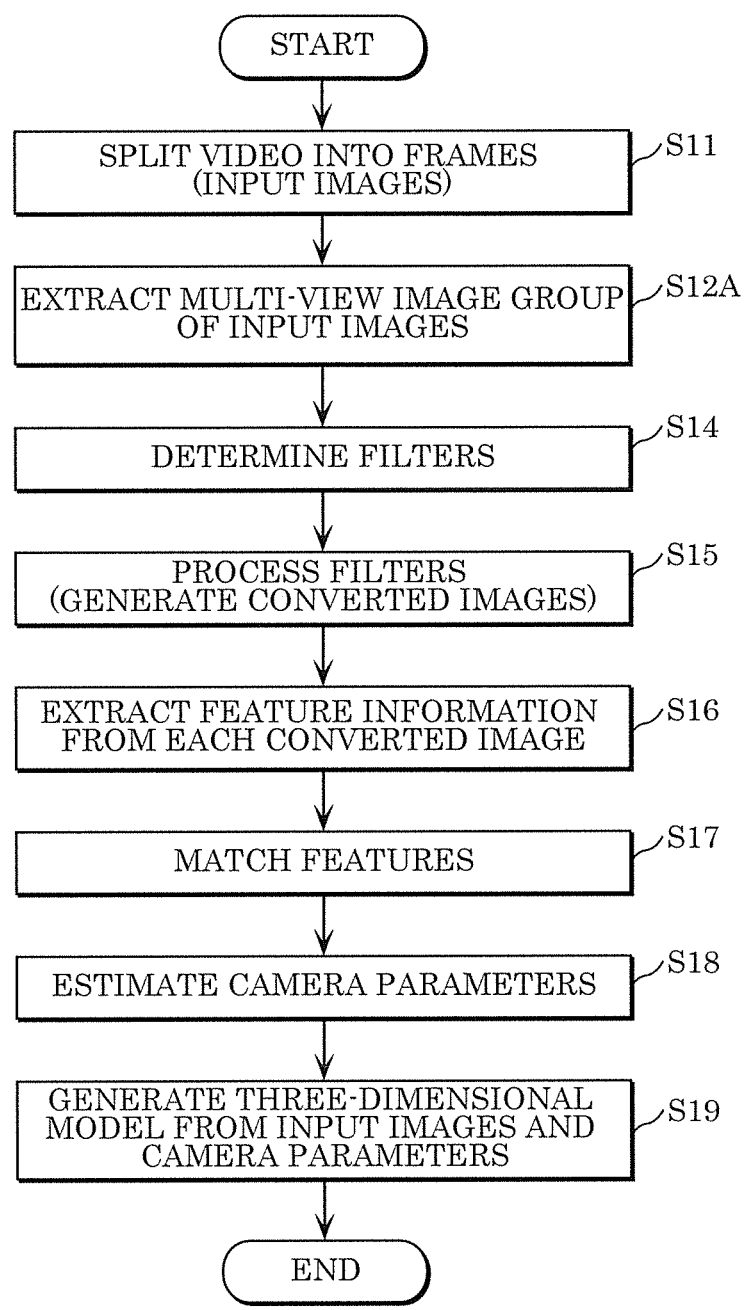
FIG. 8 illustrates a flow chart of processes performed by the three-dimensional model generation system according to Embodiment 2.

FIG. 8 illustrates a flow of processes performed by the three-dimensional model generation system according to this embodiment. In the following example, video V4 obtained by a single camera C4 capturing a building, which is a stationary object, from a plurality of viewpoints is input into input unit 201.

Figure 9:
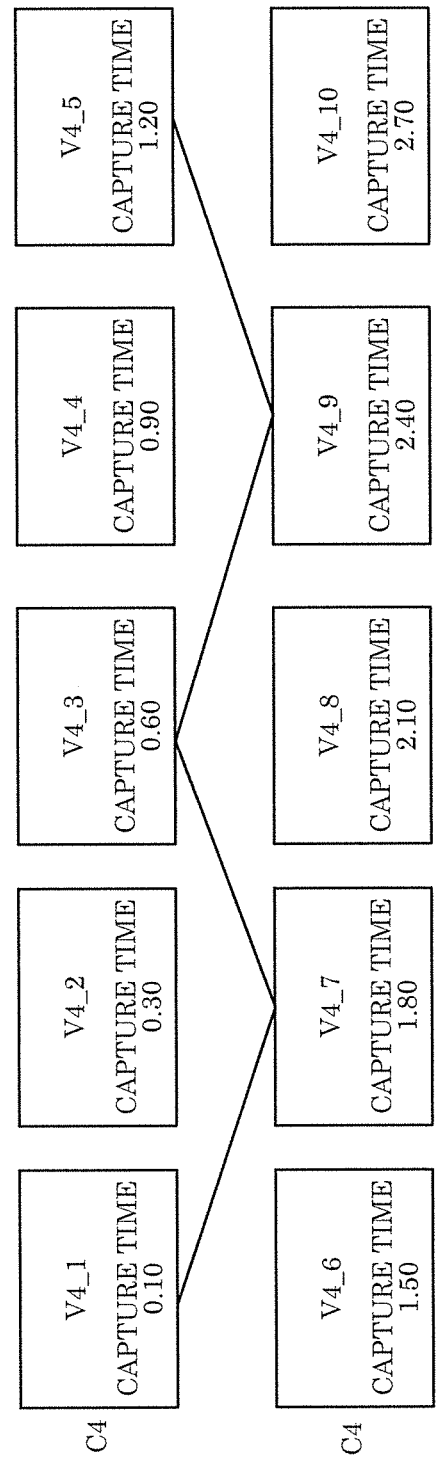
FIG. 9 illustrates an example of determining a multi-view image based on regular intervals according to Embodiment 2.

First, input unit 201 performs preprocessing on video V4 and splits preprocessed video V4 into frames (input images 211) (step S11). Here, in one example, video V4 is split into frames V4_1 through V4_10. Next, as illustrated in FIG. 9, input unit 201 selects frames V4_1, V4_3, V4_5, V4_7 and V4_9 from among the split input images 211 based on regular interval capture times, and determines the selected input images 211 to be a multi-view image group (step S12A). Note that input unit 201 may selected input images 211 based on the position or orientation of the camera at the capture time of input image 211.

Note that subsequent steps S14 through S19 are the same as in Embodiment 1. Moreover, as in Embodiment 1, end user 300 may inspect three-dimensional model 214 displayed after step S19, and when end user 300 determines that three-dimensional model 214 lacks sufficient resolution, three-dimensional model generating device 200A may obtain video data 111 from the insufficient perspective and reconstruct three-dimensional model 214.

In this way, by limiting subject 100A to a stationary object, the three-dimensional model generation system according to this embodiment can eliminate the need for, for example, a system for synchronizing capturing by cameras 101 and processing for extracting frames captured at the same time, which it turn makes it possible to generate a high-resolution three-dimensional model with fewer processes and at less of a cost.

Embodiment 3

In Embodiment 1, an example of generating converted images 212 using filters was given. In this embodiment, converted images 212B are generated via downsampling.

Figure 10:
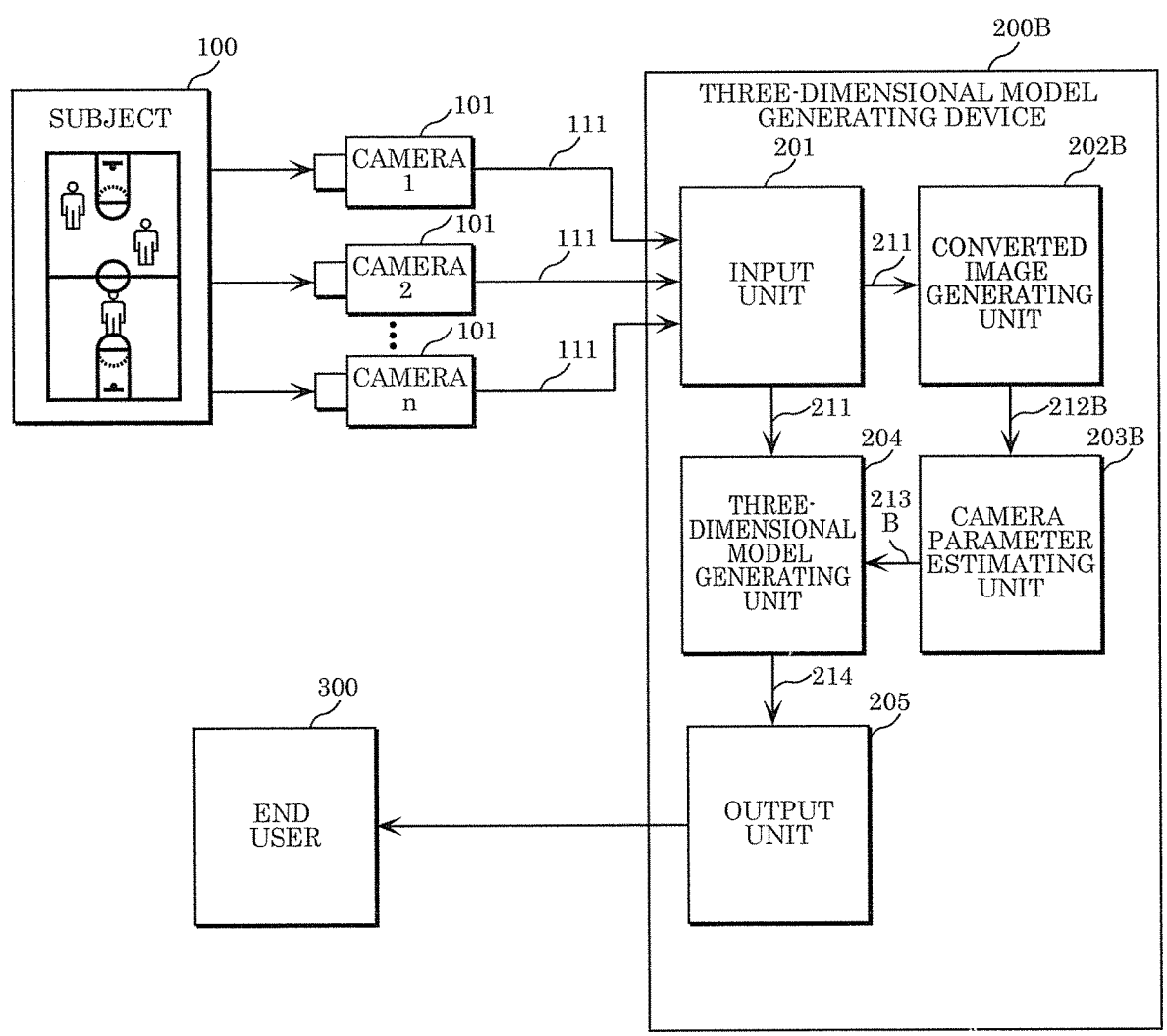
FIG. 10 illustrates the configuration of a three-dimensional model generation system according to Embodiment 3.

First, the configuration of a three-dimensional model generation system according to Embodiment 3 will be described. FIG. 10 illustrates the configuration of a three-dimensional model generation system according to this embodiment. The three-dimensional model generation system illustrated in FIG. 10 differs from the three-dimensional model generation system according to Embodiment 1 in regard to the functions of converted image generating unit 202B and camera parameter estimating unit 203B included in three-dimensional model generating device 200B.

Upon receipt of a multi-view image group from input unit 201, converted image generating unit 202B downsamples each input image 211 included in the multi-view image group by a specified downsampling factor to generate converted images 212B. Converted image generating unit 202B also outputs the generated converted images 212B and the downsampling factor used in the downsampling to camera parameter estimating unit 203. Here, downsampling is processing that generates a converted image 212B lower in resolution than the original input image 211. For example, downsampling reduces the number of pixels by sub-sampling or using a filter that calculates the average of the surrounding blocks.

Note that the downsampling factor used in the downsampling may be set in advance and may be set so as to produce converted image 212B of a preset resolution. Alternatively, converted image generating unit 202B may set the downsampling factor based on image information. For example, since it is possible to extract many features in, for example, input images 211 including many objects or input images 211 having a high spatial frequency, converted image generating unit 202B may set the downsampling factor higher for such input images 211. By increasing the downsampling factor for input images 211 with which feature matching can be easily performed in this way, it is possible to inhibit a reduction in camera parameter estimation accuracy and reduce the amount of processing. Moreover, converted image generating unit 202B may set the downsampling factor per input image 211, and, alternatively, may set a single downsampling factor for all input images 211.

Upon receiving converted images 212B in the multi-view image group and the downsampling factor, camera parameter estimating unit 203B extracts feature information from each converted image 212B, and estimates one or more camera parameters for each converted image 212B based on matching information between converted images 212B, just as in Embodiment 1. Note that the since focal length in units of pixels, which is one example of a camera parameter, changes depending on resolution, the focal length in units of pixels estimated using converted image 212B needs to be corrected to the focal length in units of pixels for the pre-downsampled input image 211. Accordingly, camera parameter estimating unit 203B corrects the camera parameters estimated using converted images 212B, based on the downsampling factor used in the downsampling. More specifically, camera parameter estimating unit 203B corrects the focal length in units of pixels using Equation 1 shown below.

$$f' = fk \quad \text{(Equation 1)}$$

Here, f' is the corrected focal length in units of pixels, f is the focal length in units of pixels estimated using converted image 212B, and k is the downsampling factor. Camera parameter estimating unit 203B outputs camera parameters 213B including the corrected focal length in units of pixels to three-dimensional model generating unit 204. Three-dimensional model generating unit 204 generates three-dimensional model 214 using the corrected camera parameters 213B and input images 211.

Figure 11:
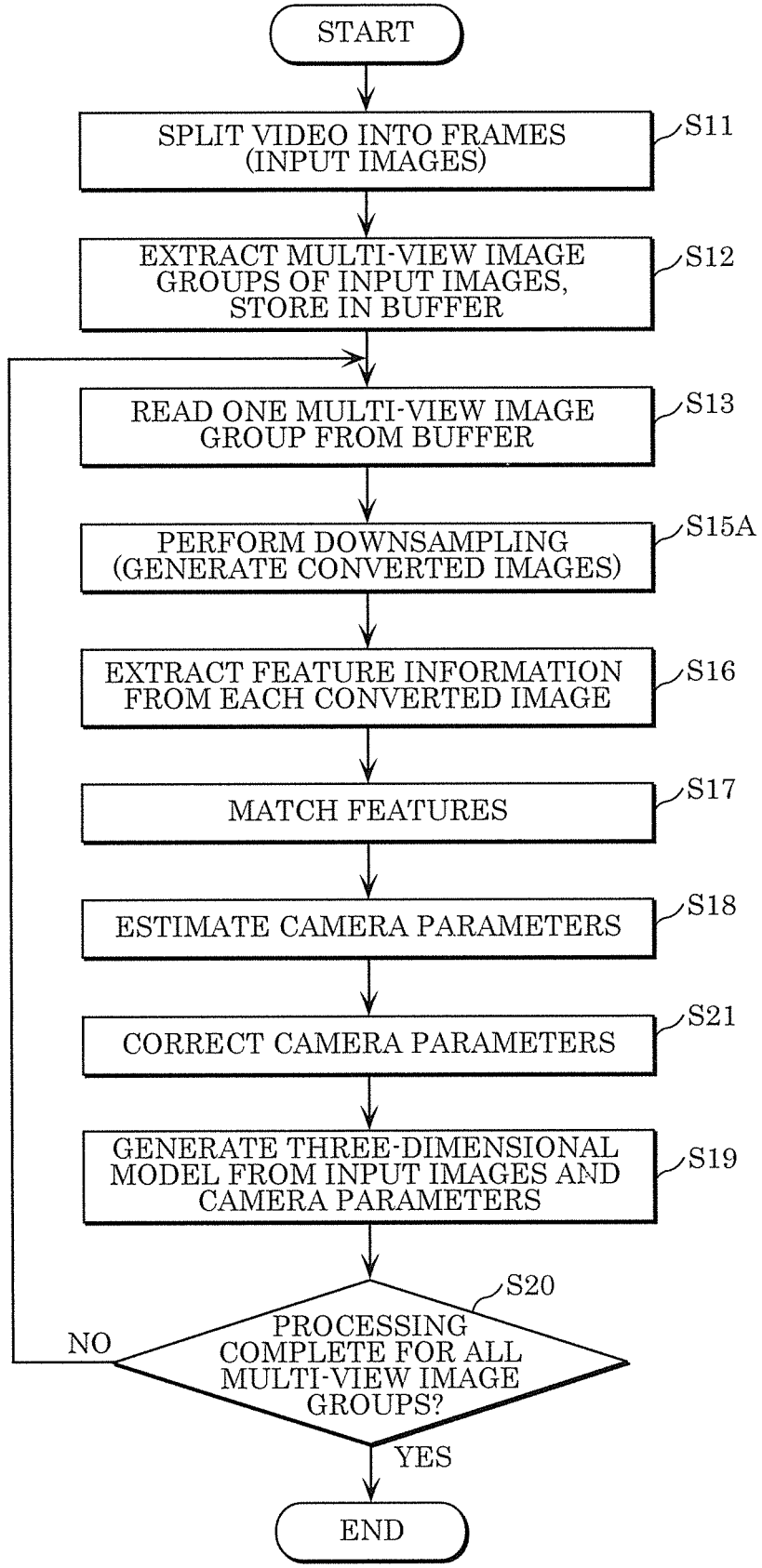
FIG. 11 illustrates a flow chart of processes performed by the three-dimensional model generation system according to Embodiment 3.

Next, an example of a flow of processes performed by the three-dimensional model generation system according to this embodiment will be described with reference to FIG. 11. Note that the processes illustrated in FIG. 11 differ from the processes illustrated in FIG. 5 in that steps S14 and S15 are replaced with step S15A, and step S21 is added. In the following example, three videos V5, V6, and V7 of moving people captured by three cameras C5, C6, and C7, respectively, are input into input unit 201.

Steps S11 through S13 are the same as in Embodiment 1, and in step S13, a multi-view image group including frames V5_1, V6_1, and V7_1 obtained from videos V5, V6, and V7, respectively, is read from the buffer. Converted image generating unit 202B sets downsampling factors k5, k6, and k7, for the frames (V5_1, V6_1, and V7_1) included in the multi-view image group, and downsamples the frames using their respective set downsampling factors (step S15A). Converted images 212B, which are the downsampled frames (V5_1, V6_1, and V7_1) are referred to as V5_1', V6_1', and V7_1'. The downsampling factor to be used is determined based on frame image information, a recording detail, or as specified in advance by the user. Here, downsampling factors k5, k6, and k7 are set so that the resolution of downsampled frame is the same.

Next, camera parameter estimating unit 203B detects features in the frames included in the multi-view image group (i.e., V5_1', V6_1', and V7_1'), and extracts feature information (step S16). Thus, searching and detection of features useful for determining camera parameters in frames downsampled in S15A can be performed with little processing and little amount of storage space. Steps S17 and S18 are the same as in Embodiment 1.

Next, when a focal length in units of pixels is included in the camera parameters for the estimated frames (V5_1', V6_1', and V7_1'), camera parameter estimating unit 203B corrects the focal length in units of pixels using Equation 1 described above (step S21). Step S19 is the same as in Embodiment 1.

Figure 12:
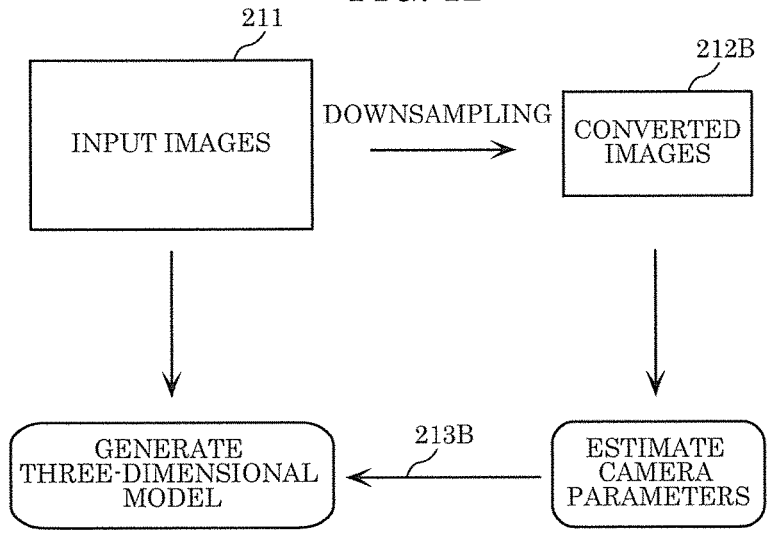
FIG. 12 illustrates processes for generating a three-dimensional model according to Embodiment 3.

FIG. 12 schematically illustrates the processes described above. As illustrated in FIG. 12, with the three-dimensional model generation system according to this embodiment, the searching and detection of features using converted images 212B obtained by downsampling input images 211 and the extraction of feature information are performed. In this way, it is possible to reduce the amount of pixel data accessed and stored in these processes, which in turn reduces the amount of processes and storage space required to estimate camera parameters.

Moreover, since processing for generating a three-dimensional model is performed using pre-downsampled input images 211, a high-resolution three-dimensional model can be generated.

Embodiment 4

In Embodiment 1, an example of generating converted images 212 using filters was given. In this embodiment, filters are used to restrict the pixels searched in input images 211 included in the multi-view image group in the detection of features in input images 211, without generating converted images 212 using filters.

Figure 13:
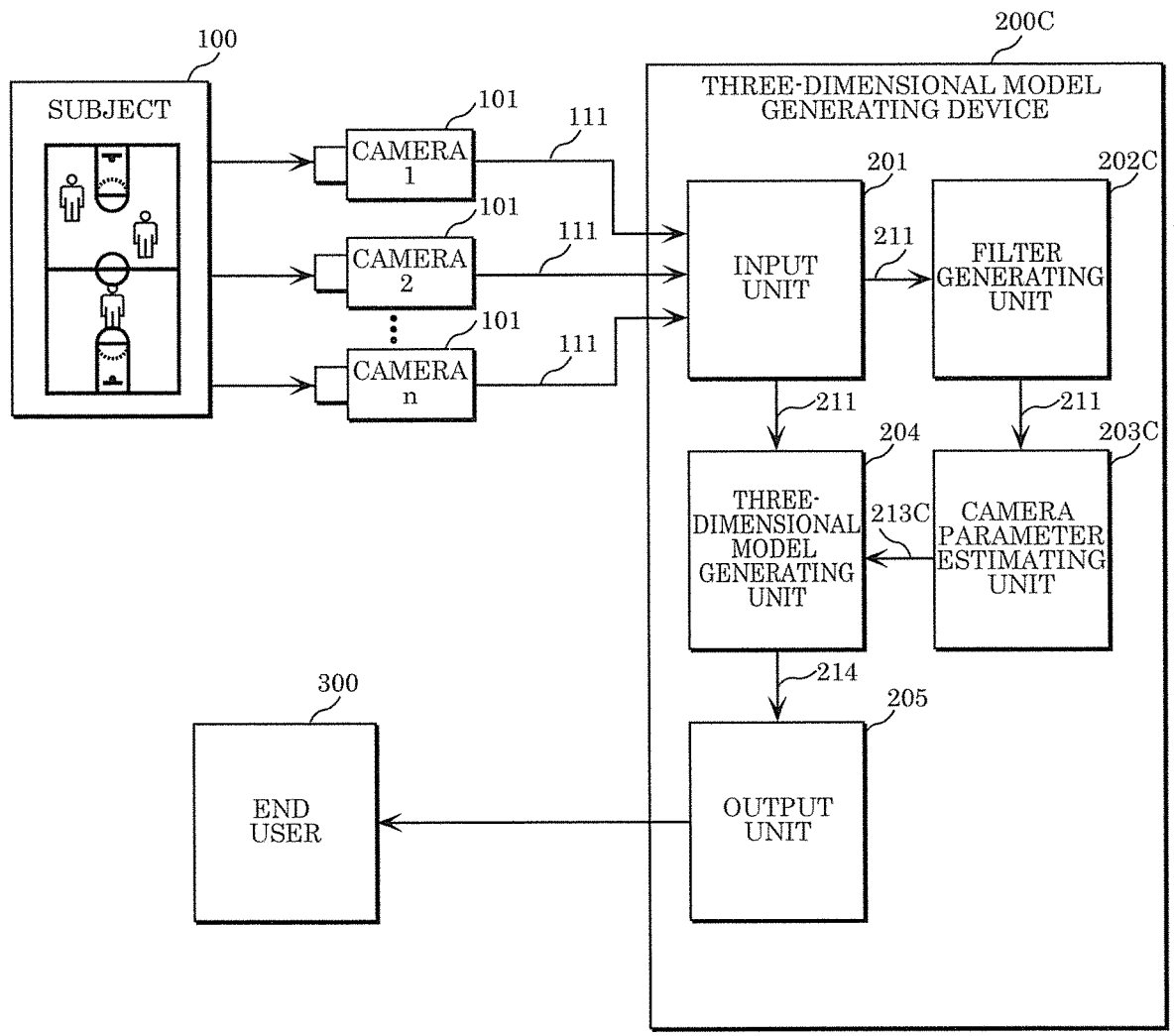
FIG. 13 illustrates the configuration of a three-dimensional model generation system according to Embodiment 4.

First, the configuration of a three-dimensional model generation system according to Embodiment 4 will be described. FIG. 13 illustrates the configuration of a three-dimensional model generation system according to this embodiment. The three-dimensional model generation system illustrated in FIG. 13 differs from the three-dimensional model generation system according to Embodiment 1 in that converted image generating unit 202 is replaced by filter generating unit 202C and the functions of camera parameter estimating unit 203C are different.

Upon receiving the multi-view image group from input unit 201, filter generating unit 202C determines, for each input image 211, a filter that restricts the region searched. Similar to Embodiment 1, the user may specify the filter to be used in advance, and, alternatively, the filter may be selected automatically based on image information or a recording detail. Filter generating unit 202C outputs input images 211 and the filters determined for input images 211 to camera parameter estimating unit 203C. In other words, for each of input images 211 included in one or more items of video data and having mutually different viewpoints, filter generating unit 202C determines pixels to be searched for features. Moreover, the total number of pixels to be searched is less than a total number of pixels in the corresponding input image 211.

Upon receiving the input images 211 and filters determined for input images 211, camera parameter estimating unit 203C extracts feature information from the input images 211 based on the corresponding filters. More specifically, when the determined filter is a binary image such as one of the images illustrated in FIG. 2A through FIG. 2H, camera parameter estimating unit 203C performs searching and detection of features only on those pixels included in input image 211 that are in the same pixel locations as pixels with pixels values of 1 in the filter. When the determined filter is a grayscale image such as one of the images illustrated in FIG. 3A through FIG. 3H, camera parameter estimating unit 203C performs searching and detection of features only on those pixels included in input image 211 that are in the same pixel locations as pixels with pixel values greater than 0 in the filter, and when the number of detected features exceeds a predetermined number, features in pixel locations corresponding to low pixel values in the filter are deleted to reduce the number of features to within the predetermined number. Alternatively, camera parameter estimating unit 203C performs searching and detection of features preferentially starting with pixels included in input image 211 that are in the same pixel locations as pixels with high pixel values in the filter, and ends the searching once a predetermined number of features have been detected, or once all pixels included in input image 211 that are in the same pixel locations are pixels with pixel values greater than 0 in the filter have been searched.

After feature information extraction, camera parameter estimating unit 203C estimates camera parameters 213C for input images 211 based on matching information between input images 211.

In this way, camera parameter estimating unit 203C detects features in input images 211 from pixels to be searched as determined by filter generating unit 202C, and estimates camera parameters 213C at the capture times of input images 211 based on a pair of similar features between two input images 211. For example, filter generating unit 202C determines pixels at predetermined pixel locations to be the pixels to be searched. For example, filter generating unit 202C further prioritizes each of the pixel locations. Camera parameter estimating unit 203C estimates camera parameter 213C preferentially using pixels at pixel locations with higher priority. For example, the predetermined pixel locations are in the central region of input image 211. Alternatively, the predetermined pixel locations include regions including four corners of input image 211. Filter generating unit 202C determines the pixels to be searched based on video content or a recording detail.

Next, an example of a flow of processes performed by the three-dimensional model generation system according to this embodiment will be described with reference to FIG. 14. Note that the processes illustrated in FIG. 14 differ from the processes illustrated in FIG. 5 in that step S15 is removed and step S16 is replaced with step S16A. In the following example, three videos V8, V9, and V10 of moving people captured by three cameras C8, C9, and C10, respectively, are input into input unit 201.

Steps S11 through S14 are the same as in Embodiment 1. A multi-view image group including frames V8_1, V9_1, and V10_1 obtained from videos V8, V9, and V10, respectively, is read from the buffer (step S13), and filter generating unit 202C determines a filter for each frame (V8_1, V9_1, and V10_1) included in the multi-view image group (step S14). Next, camera parameter estimating unit 203C detects features in the frames (V8_1, V9_1, and V10_1) included in the multi-view image group based on the corresponding filters, and extracts feature information (step S16A). With this, since the pixels on which searching and detection of features is performed are restricted based on the filter determined in step S14, detection of features useful for camera parameter estimation can be performed with little processing and little amount of storage space. Steps S17 through S20 are the same as in Embodiment 1.

With the three-dimensional model generation system according to this embodiment, the pixels in input images 211 on which searching and detection of features is performed are restricted based on filters determined for each input image 211. This makes it possible to reduce the feature information accessed and stored in these processes. As a result, it is possible to reduce the amount of processing and storage space required for camera parameter estimation.

Hereinbefore, a three-dimensional model generation system has been described based on embodiments, but the present disclosure is not limited to these embodiments.

Moreover, for example, a portion or all of the elements included in the three-dimensional model generating device according to the above embodiments are typically implemented as an LSI circuit, which is an integrated circuit. Each of these elements may be individually implemented as a single chip, or a portion or all of the elements may be implemented as a single chip.

Circuit integration is not limited to LSI; elements may be implemented as a dedicated circuit or generic processor. A field programmable gate array (FPGA) that is programmable after manufacturing of the LSI circuit, or a reconfigurable processor whose circuit cell connections and settings in the LSI circuit are reconfigurable, may be used.

In other words, in the above embodiments, elements may be configured as dedicated hardware or may be implemented by executing a software program suitable for the element. Each element may be implemented as a result of a program execution unit, such as a CPU or processor or the like, loading and executing a software program stored in a storage medium such as a hard disk or semiconductor memory.

Moreover, the block diagrams illustrate one example of the division of functional blocks, but a plurality of functional blocks may be realized as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

Moreover, the order in which the steps are executed in the flow charts are mere examples for presenting specific examples of the present disclosure; the orders are not limited to the illustrated orders. Moreover, some of the steps may be executed at the same time as (in parallel with) other steps.

Hereinbefore, a three-dimensional model generating device according to one or more aspects has been described based on embodiments, but the present disclosure is not limited to these embodiments. Those skilled in the art will readily appreciate that various modifications made in these embodiments and other embodiments obtained by arbitrarily combining the elements of the embodiments that do not materially depart from the novel teachings and advantages of the present disclosure are included within the scope of the aspects.

INDUSTRIAL APPLICABILITY

The present disclosure is applicable to three-dimensional model generating devices and three-dimensional model generation systems, and is applicable to, for example, figure creation, structure recognition for terrain or buildings, human behavior recognition, and generation of free viewpoint video.

What is claimed is:

1. A three-dimensional model generating device, comprising:
   a memory configured to store a program; and
   a processor configured to execute the program and control the three-dimensional model generating device to:
   for each of input images included in one or more items of video data and having mutually different viewpoints, generate a converted image from the input image, by extracting pixels at predetermined pixel locations in the input image;
   detect features in the converted images and estimate, for each of the input images, a camera parameter at a capture time of the input image, based on a pair of similar features between two of the converted images;
   generate a three-dimensional model using the input images and the camera parameters; and
   prioritize each of the predetermined pixel locations so that pixel locations at four corners of each of the input images are set at an increased priority level as compared to priority levels of remaining pixel locations of the predetermined pixel locations, the pixel locations at the four corners being more significantly affected by lens distortion as compared to the remaining pixel locations, wherein
   the camera parameters are estimated using, preferentially, pixels at the pixel locations at the four corners.

2. The three-dimensional model generating device according to claim 1, wherein
   the processor is further configured to execute the program and control the three-dimensional model generating device to use different priority levels depending on content of the video data or a recording detail of the video data.

3. The three-dimensional model generating device according to claim 1, wherein
   the remaining pixel locations of the predetermined pixel locations include a central region of the input image so that a priority level of pixel locations of the central region of each of the input images is set at a decreased priority level as compared to the pixel locations at the four corners of each of the input images.

4. A three-dimensional model generating method, comprising:
   generating, for each of input images included in one or more items of video data and having mutually different viewpoints, a converted image from the input image, by extracting pixels at predetermined pixel locations in the input image;
   detecting features in the converted images and estimating, for each of the input images, a camera parameter at a capture time of the input image, based on a pair of similar features between two of the converted images;
   generating a three-dimensional model using the input images and the camera parameters; and
   prioritizing each of the predetermined pixel locations so that pixel locations at four corners of each of the input images are set at an increased priority level as compared to priority levels of remaining pixel locations of the predetermined pixel locations, the pixel locations at the four corners being more significantly affected by lens distortion as compared to the remaining pixel locations, wherein
   the camera parameters are estimated using, preferentially, pixels at the pixel locations at the four corners.

5. A three-dimensional model generating device, comprising:
   a memory configured to store a program; and
   a processor configured to execute the program and control the three-dimensional model generating device to:
   determine pixels at predetermined pixel locations as pixels to be searched in feature detection in each of input images included in one or more items of video data and having mutually different viewpoints;
   detect features in the input images from the pixels to be searched and estimate, for each of the input images, a camera parameter at a capture time of the input image, based on a pair of similar features between two of the input images;
   generate a three-dimensional model using the input images and the camera parameters; and
   prioritize each of the predetermined pixel locations so that pixel locations at four corners of each of the input images are set at an increased priority level as compared to priority levels of remaining pixel locations of the predetermined pixel locations, the pixel locations at the four corners being more significantly affected by lens distortion as compared to the remaining pixel locations, wherein
   the camera parameters are estimated using, preferentially, pixels at the pixel locations at the four corners.

6. The three-dimensional model generating device according to claim 5, wherein
   the processor is further configured to execute the program and control the three-dimensional model generating device so that, for each of the input images, a total number of the pixels to be searched is less than a total number of pixels in the input image.

7. The three-dimensional model generating device according to claim 6, wherein the processor is further configured to execute the program and control the three-dimensional model generating device to determine the priority level based on content of the video data or a recording detail of the video data.

8. The three-dimensional model generating device according to claim 5, wherein
the remaining pixel locations of the predetermined pixel locations include a central region of the input image so that a priority level of pixel locations of the central region of each of the input images is set at a decreased priority level as compared to the pixel locations at the four corners of each of the input images.

9. A three-dimensional model generating method, comprising:
determining pixels at predetermined pixel locations as pixels to be searched in feature detection in each of input images included in one or more items of video data and having mutually different viewpoints;
detecting features in the input images from the pixels to be searched and estimating, for each of the input images, a camera parameter at a capture time of the input image, based on a pair of similar features between two of the input images;
generating a three-dimensional model using the input images and the camera parameters; and
prioritizing each of the predetermined pixel locations so that pixel locations at four corners of each of the input images are set at an increased priority level as compared to priority levels of remaining pixel locations of the predetermined pixel locations, the pixel locations at the four corners being more significantly affected by lens distortion as compared to the remaining pixel locations, wherein
the camera parameters are estimated using, preferentially, pixels at the pixel locations at the four corners.

* * * * *